United States Patent [19]

Hess

[11] Patent Number: 4,612,345
[45] Date of Patent: Sep. 16, 1986

[54] HYDROXYPROPYL METHYL CELLULOSE ETHERS USEFUL AS SUSPENDING AGENTS FOR SUSPENSION POLYMERIZATION OF VINYL CHLORIDE

[75] Inventor: Roland H. P. Hess, Au, Switzerland

[73] Assignee: The Dow Chemical Company, Midland, Mich.

[21] Appl. No.: 706,829

[22] Filed: Feb. 28, 1985

[51] Int. Cl.[4] ............... C08K 5/04; C08L 1/28; C08L 27/06
[52] U.S. Cl. ..................... 524/733; 536/91
[58] Field of Search .......................... 524/733

[56] References Cited

U.S. PATENT DOCUMENTS

| | | | |
|---|---|---|---|
| 2,949,452 | 8/1960 | Savage | 536/91 |
| 3,388,082 | 6/1968 | Rodgers et al. | 524/43 |
| 3,917,548 | 11/1975 | Harrington | 524/733 |
| 4,389,393 | 6/1983 | Schor et al. | 424/19 |
| 4,446,261 | 5/1984 | Yamasaki et al. | 524/733 |

FOREIGN PATENT DOCUMENTS

| | | | |
|---|---|---|---|
| EP65279 | 11/1982 | European Pat. Off. | 524/733 |
| EP80580 | 6/1983 | European Pat. Off. | 524/733 |

*Primary Examiner*—Ronald W. Griffin

[57] ABSTRACT

Hydroxypropyl methyl cellulose ethers having methoxyl substitution of from 21 to 35 percent and hydroxypropoxyl substitution of from 15 to 35 percent, are useful as suspending agents for the suspension polymerization of vinyl chloride to produce homo- and copolymers of controlled particle size and high porosity. The hydroxypropyl methyl cellulose ethers having the foregoing substitution levels and an average (number) molecular weight less than 50,000 and those having a methoxyl substitution of greater than 24 percent when the average (number) molecular weight equals or exceeds 50,000, are novel compounds.

13 Claims, No Drawings

HYDROXYPROPYL METHYL CELLULOSE ETHERS USEFUL AS SUSPENDING AGENTS FOR SUSPENSION POLYMERIZATION OF VINYL CHLORIDE

BACKGROUND OF THE INVENTION

The invention relates to suspending agents of the hydroxyproyl methyl cellulose type and to a process for preparing vinyl chloride polymers by suspension polymerization of vinyl chloride wherein hydroxypropyl methyl cellulose ethers are used as suspending agents. Furthermore, it relates to new hydroxypropyl methyl cellulose ethers.

Hydroxypropyl methyl cellulose ethers have been known for a long time. A process for preparing them is for example described in U.S. Pat. No. 2,949,452.

Hydroxypropyl methyl cellulose ethers which have a methoxyl substitution of from 27% to 30% and a hydroxypropoxyl substitution of from 4% to 7.5% and hydroxypropyl methyl cellulose ethers which have a methoxyl substitution of from 28% to 30% and a hydroxypropoxyl substitution of from 7% to 12% as well as hydroxypropyl methyl cellulose ethers which have a methoxyl substitution of from 19% to 24% and a hydroxypropoxyl substitution of from 4% to 12% are commercially available. All these cellulose ethers can be used as primary suspending agents for the suspension polymerization of vinyl chloride. They are useful for controlling the size of the produced polyvinyl chloride polymer particles. Unfortunately however, for some applications the porosity of the resulting polymer particles and accordingly their ability to absorb plasticizers is not sufficient.

From European Patent Application No. 0 080 580 it is known to use a hydroxypropyl methyl cellulose having a methoxyl substitution of 20% to 32%, a hydroxypropoxyl substitution of 2% to 10% and a viscosity of 30 to 70 mPa's as a suspending agent for producing vinyl chloride (co)polymers which polymers are used for decreasing the viscosity of pasty polyvinyl chloride dispersions. Pastes of low viscosity are useful for producing articles which comprise a low amount of plasticizers. However, these suspending agents are not useful for producing vinyl chloride polymers or copolymers with high porosity.

The present invention provides new suspending agents of the hydroxypropyl methyl cellulose type for suspension polymerization of vinyl chloride which do not have the deficiencies of the known suspending agents of this type. Particularly, the present invention provides new suspending agents of the hydroxypropyl methyl cellulose type for suspension polymerization of vinyl chloride which suspending agents are useful for increasing or controlling the porosity of the produced polyvinyl chloride particles.

From German Democratic Republic patent specification No. DD 160354 a process for producing polyvinyl chloride by suspension polymerization of vinyl chloride is known. Combinations of oil-soluble fatty acid esters are used as suspending agents. It is an object of said patent to provide polyvinyl chloride which is able to absorb large amounts of plasticizer. However, it is not clear from the teaching what are the ranges of percentage of the methoxyl and hydroxypropoxyl substitution. The only hydroxypropyl methyl cellulose ether which the patent implies to have a relatively high methoxyl and hydroxypropoxyl substitution is stated to have a methoxyl degree of substitution of 1.95 and a hydroxypropyl molar substitution of 0.42.

Hydroxypropyl methyl cellulose ethers which have a methoxyl substitution of from 16.5% to 20% and a hydroxypropoxyl substitution of from 23% to 32% as well as hydroxypropyl methyl cellulose ethers which have a methoxyl substitution of from 19% to 28% and a hydroxypropoxyl substitution of form 7.5% to 11.5% are commercially available. These hydroxypropyl methyl cellulose ethers are known to be useful in emulsion paints.

SUMMARY OF THE INVENTION

One aspect of the present invention are suspending agents of the hydroxypropyl methyl cellulose type for suspension polymerization of vinyl chloride which hydroxypropyl methyl cellulose ether has a methoxyl substitution of from 21% to 35% and a hydroxypropoxyl substitution of from 15% to 35%.

A further aspect of the present invention is the use of the above-mentioned suspending agents for suspension polymerization of vinyl chloride, optionally mixed with monomers being copolymerizable with vinyl chloride.

From U.S. Pat. No. 4,389,393 it is known to use hydroxypropyl methyl cellulose ethers having a methoxyl substitution of 16–24 weight %, a hydroxypropoxyl substitution of from 4–32 weight % and an average molecular weight of at least 50,000 as a carrier base material which is useful in sustained release therapeutic compositions. However, it is not suggested to use these hydroxypropyl methyl cellulose ethers as suspending agents. In U.S. Pat. No. 4,389,393 the above-mentioned commercially available hydroxypropyl methyl cellulose ethers are also discussed briefly. It is mentioned that the commercially available hydroxypropyl methyl cellulose ethers have a methoxyl content of from 16.5 to 30 weight % and a hydroxypropoxyl content of from 4 to 32 weight % but this statement is erroneous. The actual levels of substitution in commercial cellulose ethers have been noted above.

A part of the hydroxypropyl methyl cellulose ethers which are useful as suspending agents are novel. Accordingly, a further aspect of the present invention are new hydroxypropyl methyl cellulose ethers which have a methoxyl substitution of from 21% to 35% and a hydroxypropoxyl substitution of from 15% to 35% provided that if the average molecular weight of the cellulose ether is greater than or equal to 50,000, the methoxyl substitution is more than 24%.

These novel hydroxypropyl methyl cellulose ethers are very useful as suspending agents for suspension polymerization of vinyl chloride. Accordingly, a further aspect of the present invention is the use of these novel hydroxypropyl methyl cellulose ethers as suspending agents for suspension polymerization of vinyl chloride, optionally mixed with monomers being copolymerizable with vinyl chloride. By the use of the above-mentioned suspending agents in the suspension polymerization process, polymers can be produced which have a high particle porosity.

Another aspect of the present invention is a process for preparing vinyl chloride polymers by suspension polymerization of vinyl chloride, optionally mixed with monomers being copolymerizable with vinyl chloride, characterized in that a novel suspending agent described herein is used or a novel hydroxypropyl methyl cellulose ether of the present invention is used as a suspending agent.

DETAILED DESCRIPTION OF THE INVENTION

The hydroxypropyl methyl cellulose ethers used as suspending agents in the process of the present invention are defined primarily by their methoxyl substitution and hydroxypropoxyl substitution.

The methoxyl and hydroxypropoxyl substitution have been measured and calculated according to ASTM-D 1347-72 and ASTM-D 2363-72 respectively.

All the percentages of substitution are by weight of the finally substituted material.

The methoxyl substitution of the hydroxypropyl methyl cellulose ethers ranges from 21%, preferably from 22%, most preferably from 25%, to 35%, preferably to 33%, most preferably to 31%.

The hydroxypropoxyl substitution of the hydroxypropyl methyl cellulose ethers ranges from 15%, preferably from 16%, most preferably from 18%, to 35%, preferably to 30%, most preferably to 27%.

The sum of the percentage of the methoxyl and hydroxypropoxyl substitution is preferably at least 42% and preferably at most 58%.

Especially preferred hydroxypropyl methyl cellulose ethers for the purpose of the present invention have a methoxyl and a hydroxypropoxyl substitution of about 25% each.

The molecular weight of hydroxypropyl methyl cellulose can be expressed as the viscosity of the solution thereof in a solvent therefor. Unless otherwise stated, the molecular weight of hydroxypropyl methyl cellulose is given herein as the viscosity of a 2 weight percent solution of hydroxypropyl methyl cellulose in water as measured using a UBBELOHDE viscosimeter at 20° C.

The viscosity is generally about 5 to about 200000 mPa's. The hydroxypropyl methyl cellulose ethers which are used as suspending agents for the suspension polymerization of ethylenically unsaturated monomers have preferably a viscosity of from about 5 mPa's, most preferably from about 10 mPa's, to about 400 mPa's, most preferably to about 100 mPa's.

The viscosities of 5, 10, 100 and 400 mPa's correspond to number average molecular weights ($M_n$) of 10,000, 13,000, 26,000 and 41,000 respectively.

The novel hydroxypropyl methyl cellulose ethers of the present invention have the above-mentioned methoxyl and hydroxypropoxyl substitution provided that the average molecular weight is less than 50,000. By average molecular weight the number average molecular weight ($M_n$) is meant. The preferred average molecular weight is from 5000, most preferably from 10,000, to 40,000, most preferably to 30,000. A particularly preferred range of the molecular weight is from 13,000 to 26,000 which corresponds to a viscosity of 10 mPa's to 100 mPa's. Provided that when the average molecular weight is more than or equal to 50,000, the methoxyl substitution is more than 24%, preferably from 24.5%, most preferably from 25%, to 35%, preferably to 33%, most preferably to 31%.

The novel hydroxypropyl methyl cellulose ethers of the present invention are for example useful as suspending agents for the suspension polymerization of vinyl chloride.

The hydroxypropyl methyl cellulose ethers used for the purpose of the present invention can be produced according to known methods, for example as described in U.S. Pat. Nos. 2,949,452 and 3,388,082 the teachings of which are included herein by reference. The levels of substitution of the hydroxypropyl methyl cellulose ethers of the present invention can be achieved by increasing the amounts of propylene oxide and methyl chloride and reaction times until the desired substitution level has been reached.

The interfacial tension values of aqueous solutions of the hydroxypropyl methyl cellulose ethers used for the purpose of the present invention, measured against polar organic solvents, are generally lower than the interfacial tension values of the commercially available hydroxypropyl methyl cellulose ethers. When hydroxypropyl methyl cellulose ethers are used as suspending agents for the suspension polymerization of vinyl chloride, it is generally desirable to use hydroxypropyl methyl cellulose ethers having low interfacial tension values in order to provide high porosity of the produced polyvinyl chloride particles.

Unless otherwise mentioned, the interfacial tension values of aqueous solutions of 0.075 weight percent hydroxypropyl methyl cellulose ethers are measured against n-chlorobutane at 25° C. using a KRUESS Spinning Drop Tensiometer.

Aqueous solutions of 0.075 weight percent of hydroxypropyl methyl cellulose ethers used as suspending agents for the purpose of the present invention has an interfacial tension value of preferably less than about 10 mN/m, most preferably less than about 6 mN/m, measured against n-chlorobutane at 25° C.

In Table I, there are shown the interfacial tension values of examples 1 to 10 and of comparative example A, measured as defined above.

TABLE I

| Examples | Methoxyl weight % (a) | Hydroxypropoxyl weight % (b) | Viscosity 2 weight % in water (mPa · s) | IFT (mN/m) (c) |
|---|---|---|---|---|
| 1 | 27.9 | 21.2 | 260 | 4.76 |
| 2 | 29.2 | 21.6 | 82 | 4.06 |
| 3 | 28.9 | 20.2 | 121 | 5.87 |
| 4 | 28.1 | 21.0 | 261 | 5.37 |
| 5 | 26.1 | 24.8 | 209 | 4.27 |
| 6 | 25.5 | 25.9 | 27 | 4.87 |
| 7 | 29.2 | 19.0 | 428 | 6.21 |
| 8 | 21.1 | 31.0 | 74 | 5.11 |
| 9 | 29.3 | 17.2 | 287 | 6.49 |
| 10 | 27.0 | 18.7 | 51 | 3.1 |
| comparative example A | 28.5 | 5.8 | 50 | >10 |

(a) methoxyl substitution
(b) hydroxypropoxyl substitution
(c) interfacial tension of 0.075 weight % sample in water at 25° C. measured against n-chlorobutane by spinning drop tensiometer The hydroxypropyl methyl cellulose ethers of Examples 1 to 10 are novel.

The hydroxypropyl methyl cellulose ethers described herein are used as suspending agents for the suspension polymerization of vinyl chloride, optionally mixed with monomers being copolymerizable with vinyl chloride. Preferably, these hydroxypropyl methyl cellulose ethers are used as secondary or co-suspending agents, i.e. together with other suspending agents, for suspension polymerization of vinyl chloride.

For the production of some goods, vinyl chloride polymers or copolymers must be able to absorb plasticizers. Accordingly, particle porosity is an important property of these resins since it determines the ability of the resin to absorb liquid plasticizers.

The porosity of the polymer particles can be easily controlled or increased by using the novel suspending agents or by using the the novel hydroxypropyl methyl cellulose ethers of the present invention as suspending agents.

The suspending agents are generally used in the amount of 0.02% to 0.3%, preferably of 0.05% to 0.1%, based on the weight of the monomers.

Methods for preparing polyvinyl chloride by suspension polymerization of vinyl chloride are known in the art. Such polymerization processes are for example described in DE 2153727-B and in DD patent specification 160354, the teachings of which are included herein by reference.

Monomers which can be copolymerized with vinyl chloride are for example vinyl esters of an aliphatic monocarboxylic acid, said acid containing 1 to 18 carbon atoms, for example vinyl formate, vinyl acetate, vinyl propionate, vinyl pelargonate, vinyl laurate and vinyl stearate; alkyl esters of acrylic or methacrylic acids, for example methyl methacrylate, ethyl acrylate, butyl acrylate and lauryl methacrylate; monoolefins, for example ethylene or propylene; vinylidene halides, for example vinylidene chloride; acrylonitrile; methacrylonitrile; esters of maleic acid, for example diethyl and dipropyl maleinate; and mixtures of these monomers.

The desired amount of the suspending agent is preferably dispersed in water at a temperature of 70° C. to 95° C., most preferably above about 80° C. The resulting slurry is then cooled under agitation to a temperature of preferably 5° C. to 20° C., most preferably to below 15° C., until a constant viscosity solution is obtained.

The aqueous solution of the suspension agent can then be added to the suspension polymerization system. The polymerization can be carried out according to a known procedure.

It is often desired that by suspension polymerization of vinyl chloride, optionally mixed with monomers being copolymerizable with vinyl chloride, polymer particles are produced which have high porosity combined with relatively high bulk density. For obtaining this combination of properties it is recommended to use the new suspending agents or the new hydroxypropyl methyl cellulose ethers of the present invention as secondary suspending agents in combination with other suspending agents.

The hydroxypropyl methyl cellulose type suspending agents of the present invention are preferably used together with known hydroxypropyl methyl cellulose ethers which have a methoxyl substitution of from 19% to 30%, preferably from 27% to 30%, and a hydroxypropoxyl substitution of from 4% to 12%, preferably from 4% to 7.5%. Since such hydroxypropyl methyl cellulose ethers have the same functional groups, they are compatible with the novel suspending agents of the hydroxypropyl methyl cellulose type, i.e. the novel and the known suspending agents do not react adversely with each other.

These known hydroxypropyl methyl cellulose ethers and the novel suspending agents of the present invention are generally blended in a weight ratio of from 9:1 to 1:4 to give a mixture by which certain desired porosities of polyvinyl chloride prepared by suspension polymerization can be obtained. A preferred weight ratio of the mentioned known hydroxypropyl methyl cellulose ethers and the novel suspending agents of the hydroxypropyl methyl cellulose type is from 4:1 to 1:3.

Such mixtures of hydroxypropyl methyl cellulose type suspending agents are generally used in amounts of 0.02 to 0.3 weight percent, preferably in amounts of 0.05 to 0.15 weight percent, based on the weight of monomers to be polymerized.

In the following working example the production of polyvinyl chloride according to a known suspension polymerization process is described.

In the comparative run 0.15% of the known hydroxypropyl methyl cellulose ether of comparative example A (see Table I), based on the weight of vinyl chloride, is used as a suspending agent. In additional runs, this suspending agent is used in combination with or is partially replaced by the novel cellulose ether of example 1 (see Table I).

The concentrations of suspending agents used, the particle size and the particle size distribution, the porosity and the bulk density of the produced polyvinyl chloride is set forth in Table II. Unless otherwise noted, all percentages are based on the weight of vinyl chloride. The invention is not limited to the working example.

WORKING EXAMPLE 750 g vinyl chloride, 1500 g deionized water, 0.10% of bis(4t-butylcyclohexyl)-peroxidicarbonate, commercially available from Noury Chemical Company, U.S.A as "Percadox 16W40", 0.08% sodium bicarbonate and the concentration of suspending agent from the compositions of comparative Example A and Example 1 set forth in Table II are charged into a three liter jacketed stainless steel reactor, equipped with turbine agitators and two knife baffles.

The agitator speed is 450 revolutions per minute. The mixture is reacted at about 55° C. until a drop in pressure of 10 pounds/sq. inch (69 mbar) is observed in the reactor indicating that substantially most of the monomeric reactant has been consumed.

TABLE II

| Suspending agent Concentration (weight percent) | | Particle size (microns) | Particle size distribution (% <75 microns) (% >250 microns) | | Porosity ($cm^3/g$) | Bulk density settled ($g/cm^3$) |
|---|---|---|---|---|---|---|
| A* | 1** | Average | % <75 | % >250 | | |
| 0.15 | — | 147 | 3.8 | 4.8 | 0.07 | 0.67 |
| 0.15 | 0.038 | 160 | 2.5 | 8.0 | 0.15 | 0.65 |
| 0.15 | 0.075 | 169 | 2.2 | 11.1 | 0.22 | 0.59 |
| 0.15 | 0.112 | 174 | 2.2 | 13.2 | 0.24 | 0.53 |
| 0.15 | 0.15 | 170 | 2.8 | 12.6 | 0.22 | 0.54 |
| 0.112 | 0.038 | 177 | 1.4 | 11.2 | 0.15 | 0.57 |
| 0.075 | 0.075 | 240 | 0.5 | 51.7 | 0.24 | 0.52 |
| 0.038 | 0.112 | 305 | 0 | 76.2 | 0.30 | 0.49 |

*methoxyl substitution: 28.5% hydroxypropoxyl substitution: 5.8%
**methoxyl substitution: 27.9% hydroxypropoxyl substitution: 21.2%

Further batches of polyvinyl chloride were produced according to the working example above. 0.15 weight percent of the hydroxypropyl methyl cellulose ether of Comparative Example A and 0.075% of the hydroxypropyl methyl cellulose ether of Examples 4, 5 and 6 (see table I) were used as suspending agents. Particle size distribution, bulk density and porosity of the produced polyvinyl chloride has been compared to a comparative run wherein only 0.15 weight percent of hydroxypropyl methyl cellulose ether of comparative Example A has been used as suspending agent.

TABLE III

| Suspending agent In addition to 0.15% comp. Ex. A (weight percent) | Particle size distribution (% <75 microns/ % >250 microns) % <75 | | Porosity (cm³/g) | Bulk density settled (g/cm³) |
| --- | --- | --- | --- | --- |
| | | % >250 | | |
| (no additional agent) | 3.8 | 4.8 | 0.07 | 0.67 |
| 0.075% Ex. 4 | 1.1 | 12.0 | 0.16 | 0.54 |
| 0.075% Ex. 5 | 1.1 | 12.6 | 0.19 | 0.56 |
| 0.075% Ex. 6 | 0.8 | 18.9 | 0.19 | 0.55 |

As shown by Tables II and III, the porosity of the polyvinyl chloride produced according to the suspension polymerization of vinyl chloride can be increased considerably by using the novel hydroxypropyl methyl cellulose ethers in addition to or partially replacing the known hydroxypropyl methyl cellulose ethers which are used as suspending agents for controlling the particle size of the polymer particles. The bulk density is thereby not drastically reduced.

I claim:

1. A process for preparing polymers comprising vinyl chloride by suspension polymerization of vinyl chloride in the presence of a suspending agent, characterized in that the suspending agent is a hydroxypropyl methyl cellulose having a methoxyl substitution of from 21 percent to 35 percent and a hydroxypropoxyl substitution of from 15 percent to 35 percent.

2. Process of claim 1 wherein additionally a water soluble hydroxypropyl methyl cellulose ether having a methoxyl substitution of from 19% to 30% and a hydroxypropoxyl substitution of from 4% to 12% is used as a suspending agent.

3. Process of claim 2 wherein additionally a water soluble hydroxypropyl methyl cellulose ether having a methoxyl substitution of from 27% to 30% and a hydroxypropoxyl substitution of from 4% to 7.5% is used as suspending agent.

4. The process of claim 3, wherein particles of vinyl chloride polymers have a particle size distribution wherein less than 0.8 percent are smaller than 75 microns and less than 18.9 percent are larger than 250 microns; a particle porosity of 0.19 g/cm³; and a bulk density of 0.55 g/cm³.

5. The process of claim 1 characterized in that the suspending agent is a hydroxypropyl methyl cellulose ether having a methoxyl substitution of from 22 percent and a hydroxypropoxyl substitution of from 16 percent to 30 percent.

6. The process of claim 5 characterized in that the suspending agent is a hydroxypropyl methyl cellulose ether having a methoxyl substitution of from 25 percent to 31 percent and a hydroxypropoxyl substitution of from 18 percent to 27 percent.

7. The process of claim 1 characterized in that the suspending agent is a hydroxypropyl methyl cellulose ether wherein the sum of the methoxyl and hydroxypropoxyl substitution is from 42 percent to 58 percent.

8. The process of claim 1 characterized in that the suspending agent is a hydroxypropyl methyl cellulose ether wherein the methoxyl substitution is more than 24 percent provided that the number average molecular weight is at least 50,000.

9. The process of claim 1 characterized in that the suspending agent is a hydroxypropyl methyl cellulose ether having a number average molecular weight of from 5,000 to 40,000.

10. The process of claim 9 characterized in that the suspending agent is a hydroxypropyl methyl cellulose ether having a number average molecular weight of from 10,000 to 30,000.

11. The process of claim 1 characterized in that the suspending agent is a hydroxypropyl methyl cellulose ether, and the interfacial tension of a 0.075 weight percent solution of said hydroxypropyl methyl cellulose ether in water measured against n-chlorobutane at 25° C. is lower than 10 mN/m.

12. The process of claim 11 characterized in that the suspending agent is a hydroxypropyl methyl cellulose ether, and said interfacial tension is lower than 6 nN/m.

13. The process of claim 1 characterized in that vinyl chloride is mixed with monomers being copolymerizable with vinyl chloride.

* * * * *